United States Patent
Scheirich et al.

(10) Patent No.: US 10,677,594 B2
(45) Date of Patent: Jun. 9, 2020

(54) MICROELECTROMECHANICAL SYSTEM (MEMS) DEVICE READOUT WITH OPTICAL DIRECTIONAL COUPLER

(71) Applicant: Honeywell International Inc., Morris Plains, NJ (US)

(72) Inventors: Jan Scheirich, Stochov (CZ); Tomas Neuzil, Brn (CZ); Martin Vagner, Sumperk (CZ)

(73) Assignee: Honeywell International Inc., Morris Plains, NJ (US)

(*) Notice: Subject to any disclaimer, the term of this patent is extended or adjusted under 35 U.S.C. 154(b) by 326 days.

(21) Appl. No.: 15/876,955

(22) Filed: Jan. 22, 2018

(65) Prior Publication Data
US 2019/0226847 A1    Jul. 25, 2019

(51) Int. Cl.
*G01C 19/5656* (2012.01)
*G01C 19/5712* (2012.01)
(Continued)

(52) U.S. Cl.
CPC ..... *G01C 19/5712* (2013.01); *G01C 19/5677* (2013.01); *G01C 19/5726* (2013.01);
(Continued)

(58) Field of Classification Search
CPC .......... G01C 19/5712; G01C 19/5642; G01C 19/5649; G01C 19/5656; G01C 19/5719;
(Continued)

(56) References Cited

U.S. PATENT DOCUMENTS 8,269,976 B2    9/2012   Kilic et al.
8,542,365 B2    9/2013   Pruessner et al.
(Continued)

FOREIGN PATENT DOCUMENTS

EP    3088905 A1    11/2016
EP    3109644 A1    12/2016
(Continued)

OTHER PUBLICATIONS

European Patent Office, "Extended European Search Report from EP Application No. 19152413.1 dated Jun. 25, 2019", from Foreign Counterpart to U.S. Appl. No. 15/876,955, pp. 1-6, Published: EP.
(Continued)

*Primary Examiner* — Robert R Raevis
(74) *Attorney, Agent, or Firm* — Fogg & Powers LLC

(57) ABSTRACT

A microelectromechanical systems (MEMS) device comprises an optical directional coupler comprising: a first waveguide having a first and a second end, wherein a light beam is introduced into the first end; a second waveguide having a third and a fourth end, wherein the light beam is evanescently coupled between the two waveguides in the central region; a first photodetector to detect first optical power in the light beam at the second end; and a second photodetector to detect second optical power in the light beam at the fourth end; a vibrating proof mass adjacent to the coupler in a first direction from the coupler, wherein when inertial forces are applied to the MEMS device in a second direction, the proof mass moves in the first direction; a processor to determine the displacement of the proof mass from the coupler as a function of the first and the second optical power.

20 Claims, 8 Drawing Sheets

(51) Int. Cl.
*G01C 19/5726* (2012.01)
*G01P 15/093* (2006.01)
*G01P 15/097* (2006.01)
*G02B 6/35* (2006.01)
*G01C 19/5733* (2012.01)
*G01C 19/5677* (2012.01)
*G01C 19/5776* (2012.01)
*G01C 19/72* (2006.01)
*G01P 3/44* (2006.01)

(52) U.S. Cl.
CPC ..... *G01C 19/5733* (2013.01); *G01C 19/5776* (2013.01); *G01C 19/722* (2013.01); *G01C 19/727* (2013.01); *G01P 3/44* (2013.01); *G01P 15/093* (2013.01); *G01P 15/097* (2013.01); *G02B 6/3536* (2013.01)

(58) Field of Classification Search
CPC .............. G01C 19/574; G01C 19/5747; G01C 19/5755; G01C 19/5677; G01C 19/5726; G01C 19/722; G01C 19/727; G01C 19/5776; G01P 3/44; G01P 2015/0862; G01P 2015/0865; G01P 15/097; G01P 15/125
USPC ................ 73/503.3, 1.38, 861.354–861.357, 73/504.02–504.16, 514.15, 514.16, 73/514.26, 514.29; 356/2, 4.01, 4.06
See application file for complete search history.

(56) References Cited

U.S. PATENT DOCUMENTS

| | | | |
|---|---|---|---|
| 9,212,911 | B1 | 12/2015 | Tal et al. |
| 9,528,829 | B2 | 12/2016 | Bhave et al. |
| 2005/0163418 | A1 | 7/2005 | Wong et al. |
| 2011/0302694 | A1 | 12/2011 | Wang et al. |
| 2015/0131106 | A1 | 5/2015 | Pruessner et al. |
| 2016/0202284 | A1* | 7/2016 | Paquet .............. G01P 15/093 73/514.26 |
| 2016/0320180 | A1 | 11/2016 | Lodden et al. |
| 2016/0349283 | A1* | 12/2016 | Bramhavar ........... G01P 15/093 |
| 2018/0038890 | A1* | 2/2018 | Dahlem .............. G01P 15/093 |

FOREIGN PATENT DOCUMENTS

| | | |
|---|---|---|
| WO | 2015088724 A1 | 6/2015 |
| WO | 2015088726 A1 | 6/2015 |

OTHER PUBLICATIONS

Pruessner et al., "InP-Based Optical Waveguide MEMS Switches With Evanescent Coupling Mechanism", Journal of Microelectromechanical Systems, Oct. 2005, pp. 1070-1081, vol. 14, No. 5, IEEE.

\* cited by examiner

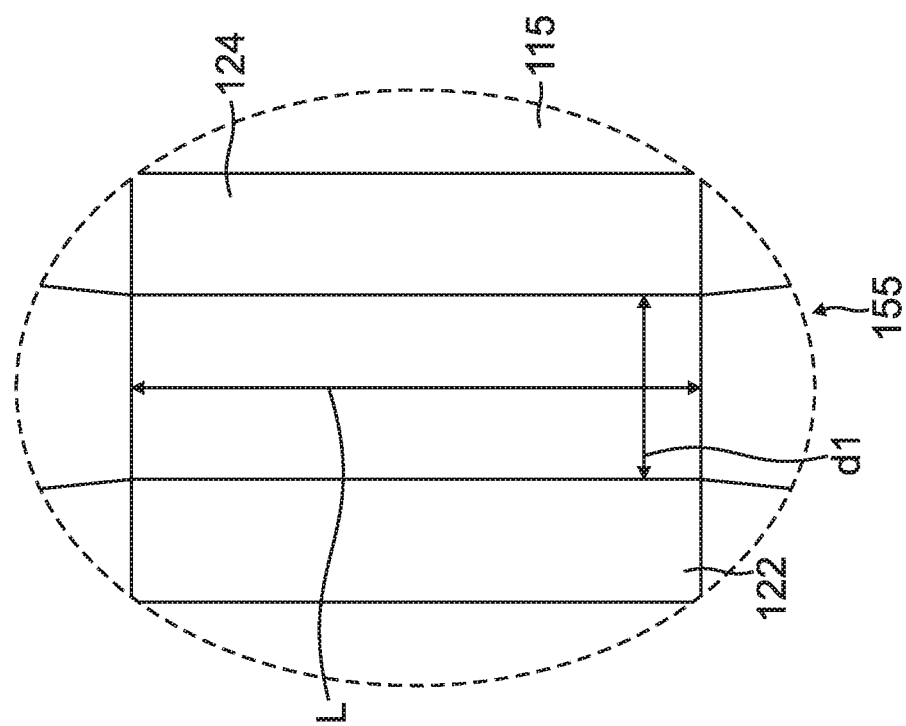

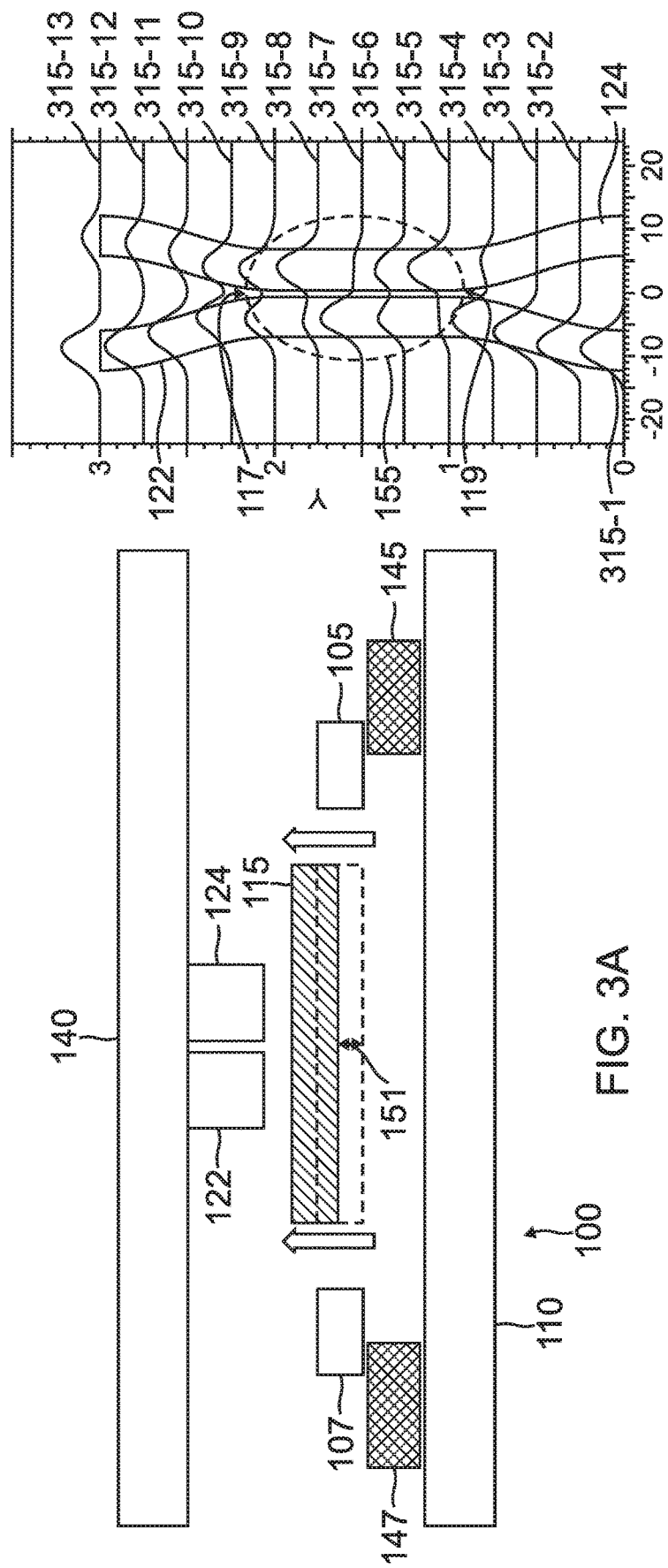

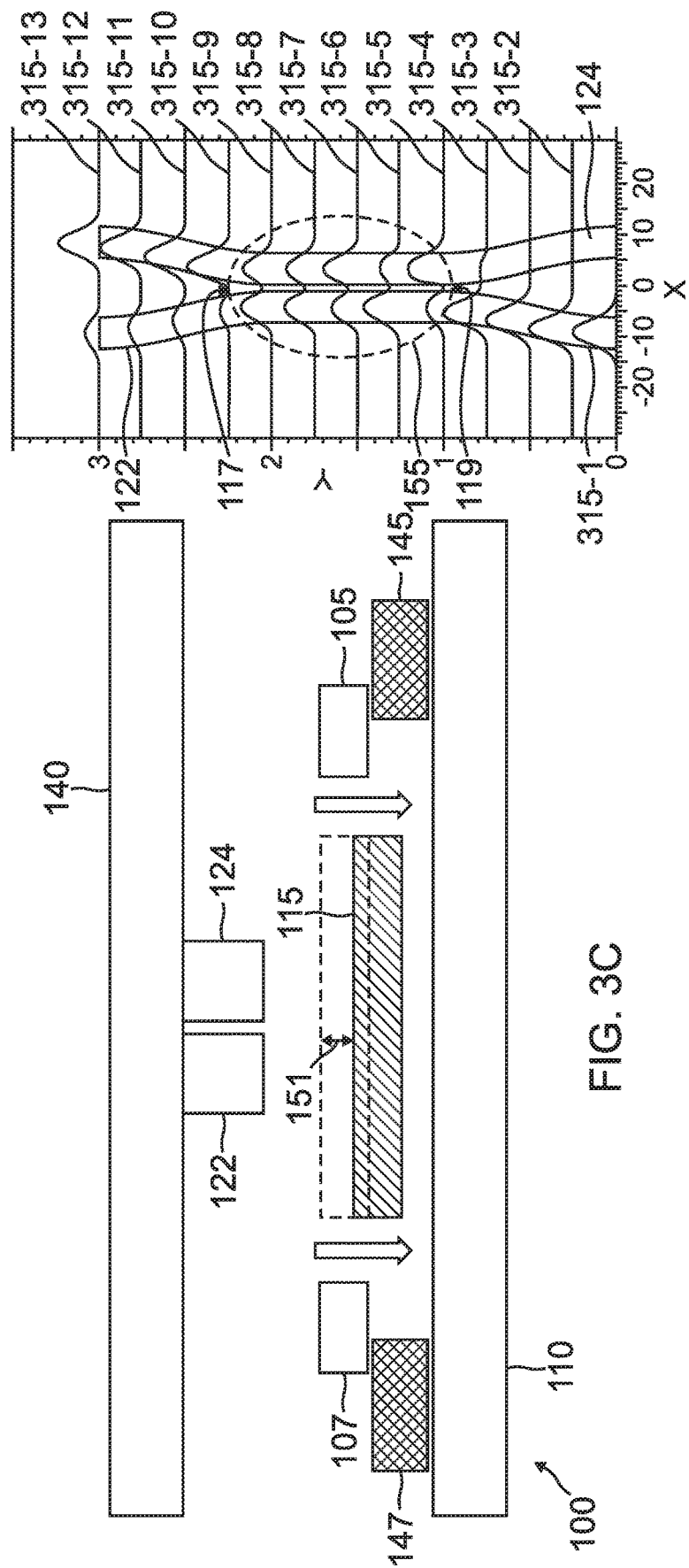

MICROELECTROMECHANICAL SYSTEM (MEMS) DEVICE READOUT WITH OPTICAL DIRECTIONAL COUPLER

BACKGROUND

Microelectromechanical systems (MEMS) technology is widely used in inertial navigation sensors as a miniaturized and low-cost solution. In conventional systems, displacement of a vibrating proof mass, which is directly proportional to rotation or acceleration, is sensed electrostatically. Electrical readout, such as capacitive sensing, is used in conventional practice. Electrical readout suffers from crosstalk of moving mass excitation circuit and noise pickup from harsh environment. These effects make significant portion of an error signal and thus degrading sensor performance. Further, the change of capacitance in conventional gyroscopes is small.

For the reasons stated above and for other reasons stated below, it will become apparent to those skilled in the art upon reading and understanding the specification, there is a need in the art for a MEMS device such that the displacement in the vibrating proof mass can be determined through optical sensing.

SUMMARY

A microelectromechanical systems (MEMS) device is provided. The MEMS device comprises an optical directional coupler. The optical directional coupler comprises at least one light source configured to provide a light beam. The optical directional coupler further comprises at least one substrate. The optical directional coupler also comprises a first waveguide formed on the at least one substrate, the first waveguide having a first end and the second end, wherein the first end of the first waveguide is coupled to the at least one light source, wherein the light beam is introduced into the first end of the first waveguide. The optical directional coupler further comprises a second waveguide formed on the substrate, the second waveguide having a third end and a fourth end, wherein the first waveguide and the second waveguide are positioned adjacent to each other at a central region of the optical directional coupler at a distance such that the light beam is at least partially evanescently coupled between the first waveguide and the second waveguide in the central region when the light beam is introduced into the first end of the first waveguide. The optical directional coupler also comprises a first photodetector coupled to a second end of the first waveguide, wherein the first photodetector is configured to detect a first optical power in the light beam propagating through the first waveguide at the second end. Finally, the optical directional coupler comprises a second photodetector coupled to a fourth end of the second waveguide, wherein the second photodetector is configured to detect a second optical power in the light beam propagating through the second waveguide at the fourth end. The MEMS device further comprises at least one vibrating proof mass positioned adjacent to the optical directional coupler in a first direction from the optical directional coupler, wherein the at least one vibrating proof mass is equidistant from the first waveguide and the second waveguide, wherein when one or more inertial forces are applied to the MEMS device in second direction, the at least one vibrating proof mass is excited by at least one electrode, and wherein the at least one vibrating proof mass is configured to move in the first direction. The MEMS device also comprises at least one processor coupled to the first photodetector and the second photodetector, wherein the processor is configured to determine the displacement of the at least one proof mass from the optical directional coupler as a function of the first optical power and the second optical power.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 1A illustrates an exemplary central region of the MEMS device of FIG. 1 according to the embodiments of the present disclosure.

FIGS. 3A and 3C are cross section views of embodiments of a MEMS device including a vibrating proof mass displaced in a z-direction according to the embodiments of the present disclosure.

FIGS. 3B and 3D are graphical representation of optical power distribution in example optical directional coupler of a MEMS device of FIGS. 3A and 3C, respectively according to the embodiments of the present disclosure.

Figure 1:
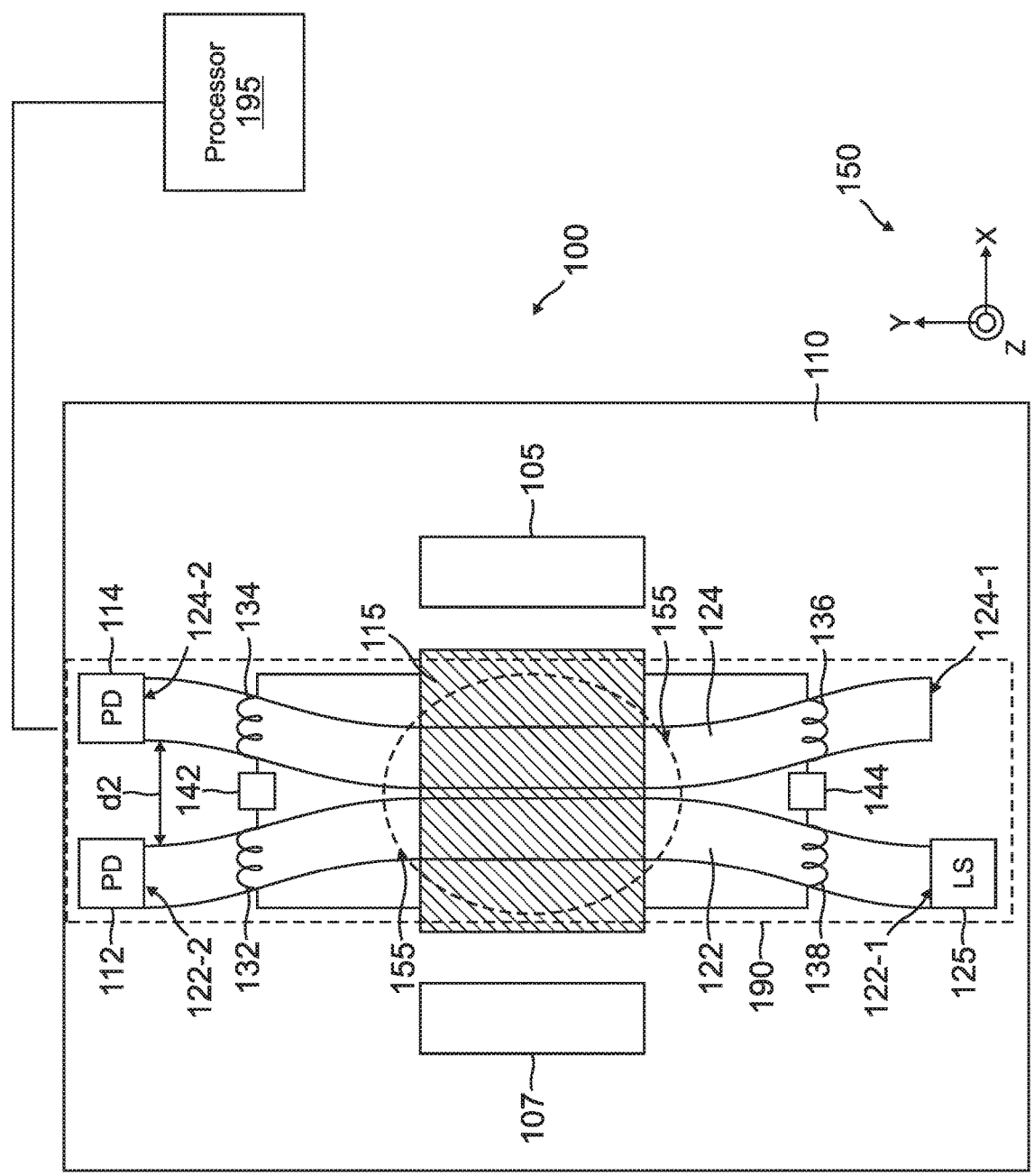
FIG. 1 is a top view of one embodiment of a microelectromechanical (MEMS) device including an optical directional coupler according to the embodiments of the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present description provide systems and methods for determining inertial forces applied on a microelectromechanical systems (MEMS) device. Embodiments provided herein include an optical directional coupler to determine the displacement of a vibrating proof mass of the MEMS device that is proportional to the inertial forces applied on the MEMS device. As disclosed herein, the displacement of the vibrating proof mass can be determined through optical sensing.

FIG. 1 is a top view of one example of a MEMS device 100 of one embodiment of the present disclosure. In the particular embodiment shown in the figures, a MEMS gyroscope is illustrated as an example MEMS device. However, in other embodiments, MEMS device 100 may comprise a MEMS accelerometer or other MEMS sensor. MEMS gyroscope 100 includes an optical directional coupler 190 that comprise two waveguides, a first waveguide 122 and a second waveguide 124. Waveguide 122 comprises two ends, a first end 122-1 and a second end 122-2. Waveguide 124 comprises two ends, a first end 124-1 and a second end 124-2. At least one light source 125 is coupled to the first waveguide 122 at the first end 122-1. The optical directional coupler 190 further includes two photodetectors, a first photodetector 112 coupled to waveguide 122 at the second end 122-2, and a second photodetector 114 coupled to waveguide 124 at the second end 124-2.

Figure 2:
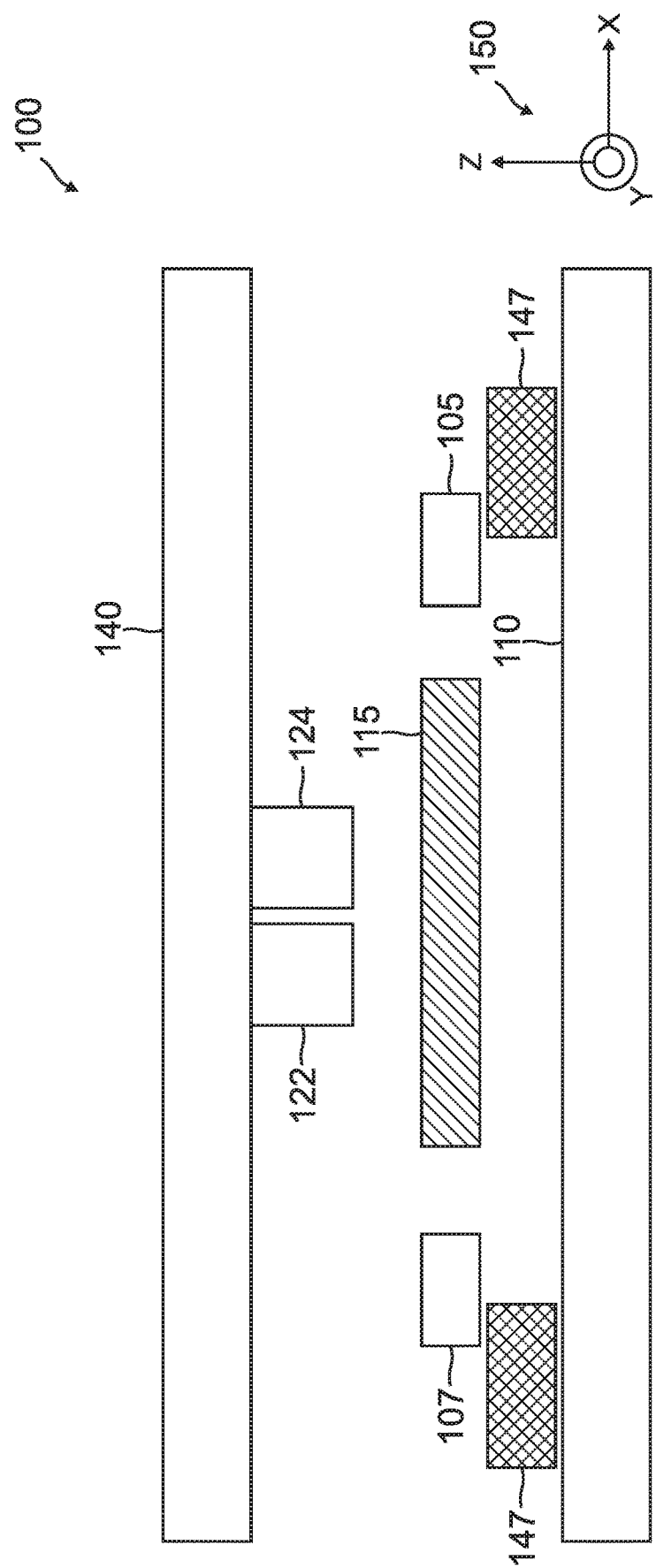
FIG. 2 is a cross-section view of the MEMS device of FIG. 1 according to the embodiments of the present disclosure.

As shown in FIG. 2, in one embodiment, the waveguides 122 and 124 are fabricated on substrate 140. In example embodiments, substrate 140 is fabricated from at least one of glass, silicon or silicon oxide. In one such embodiment, waveguides 122 and 124 may be fabricated photolytically on the substrate 140 from at least one of epoxy and silicon. In some example embodiments, waveguides 122 and 124 are fabricated from epoxy on a glass substrate 140. In some example embodiments, waveguides 122 and 124 are fabricated from silicon on a silicon oxide substrate 140.

The MEMS gyroscope 100 further includes a vibrating proof mass 115. In exemplary embodiments, vibrating proof mass 115 is coupled to a second substrate 110. In exemplary embodiments, substrate 110 is fabricated of silicon. In exemplary embodiments, vibrating proof mass 115 is composed of silicon. In some embodiments, vibrating proof mass 115 may be fabricated by etching into a silicon layer deposited over a silicon oxide layer 147 coupled to substrate 110. In exemplary embodiments, vibrating proof mass 115 is attached to an anchor 142 with springs 132 and 134, and to an anchor 144 with springs 136 and 138. The springs 132, 134, 136, 138 and anchors 142 and 144 enable vibrating proof mass 115 to freely move in x and z directions (see reference 150).

MEMS device 100 further includes at least one electrode 107. The vibrating proof mass 115 is excited by electrode 107 to move in a first direction (for example, x-axis). In exemplary embodiments, vibrating proof mass 115 is excited by at least one of electrostatic excitation, a piezoelectric excitation, or electromagnetic excitation. In exemplary embodiments, MEMS device further includes a second electrode 105. Displacement of vibrating proof mass 115 in the first direction is sensed by electrode 105. When rotation is applied to the MEMS device around a second direction, which is the in-plane axis (for example, the y-axis), the movement in the first direction is coupled to the movement in the second direction due to Coriolis effect.

Returning to FIG. 1, waveguides 122 and 124 are equidistant from vibrating proof mass 115. As shown in FIG. 1A, in example embodiments, distance d1 between waveguides 122 and 124 is less in central region 155 than the distance d2 between waveguides 122 and 124 at ends 122-1 and 124-1, and ends 122-2 and 124-2. Because waveguides 122 and 124 are closely spaced in central region 155, when the light from light source 125 propagating in at least one of the waveguides 122 and/or 124 enters central region 155, and evanescent field is produced from this light. This evanescent coupling of modes in waveguides 122 and 124 can result in an overlapping of modes and causes the light beam to repeatedly propagate between waveguide 122 and 124 in central region 155. In other words, the evanescent field allows coupling of modes back and forth from waveguide 122 to 124 in central region 155. Subsequently, this results in power distribution from waveguide 122 to 124 and vice versa.

This distribution of power from waveguide 122 to 124 depends on effective refractive index of waveguides 122 and 124. The effective refractive index of waveguides 122 and 124 increases or decreases based on the movement of vibrating proof mass 115 in the z-direction in central region 155. The effective refractive index is a measure of the overall delay of light beam in waveguides 122 and 124. Accordingly, change in the effective refractive index affects the phase velocity in waveguides 122 and 124, and changes the distribution of light in the central region 155. That is, the number of times that the light beam propagates between waveguides 122 and 124 is based on the rate at which the phase of the light beam propagates in the waveguides.

The evanescent field interaction is limited to central region 155. As the waveguides 122 and 124 approach the end of the central region 155, they are fabricated to be widened such that distance d2 between waveguides 122 and 124 at ends 122-2 and 124-2 is greater than distance d1 in central region 155. The evanescent field decays exponentially with distance from the waveguide core, so in general d1 will be considerably smaller than waveguide core thickness to achieve sufficient coupling. In exemplary embodiments, distance d1 is smaller than the core thickness of waveguides 122 and 124. In exemplary embodiments, the evanescent field does not interact with the neighboring waveguide. Photodetector 112 detects the power of the light beam propagating in waveguide 122 at end 122-2 at a given time and photodetector 114 detects the power of the light beam propagating in waveguide 124 at end 124-2 at the given time.

Central region 155 ends at a point of separation after which waveguides 122 and 124 are widened. After the point of separation, the light beam cannot easily propagate back and forth between waveguide 122 and 124. The optical power in waveguides 122 and 124 can then be detected by photodetector 112 and 114, and the position of the vibrating proof mass 115 can be determined by ratio of optical power at end 122-2 of waveguide 112 and end 124-2 of waveguide 114.

As shown below, the position of the vibrating proof mass 115 can be determined based on Equation 1:

$$z(t)=f(P_{D,PDA}(t)-P_{D,PDB}(t)) \quad \text{Equation 1}$$

In Equation 1, z(t) represents the position of the vibrating proof mass 115 in the z-direction at time t. As shown by Equation 1, z(t) varies as a function of $P_{D, PDA}(t)$ and $P_{D, PDB}(t)$, which are the power detected by photodetectors 112 and 114 at ends 122-2 and 124-2 respectively at time t. The position of the vibrating proof mass 115 at a given time is determined as a function of a difference between the power detected by photodetector 112 at end 122-2 and power detected by photodetector 114 at end 124-2 at the given time.

The effective refractive index of waveguides 122 and 124, and hence, the phase velocity of the waveguides changes depending on the position of vibrating proof mass 115. Accordingly, in some exemplary embodiments, when the vibrating proof mass 115 moves closer to waveguides 122 and 124, the optical power is more significant in waveguide 122 at the point of separation 117, and as the vibrating proof mass moves farther away from waveguides 122 and 124, the optical power is more significant in waveguide 124 at the point of separation 117. Displacement 151 in FIGS. 3A and 3C is the displacement of the vibrating proof mass when inertial forces are applied on MEMS device 100. In the embodiment when MEMS device 100 is a gyroscope, displacement 151 is the displacement of the vibrating proof mass 115 when rotation is applied on the MEMS gyroscope. In the embodiment when MEMS device 100 is an accelerometer, displacement 151 is the displacement of the vibrating proof mass 115 when acceleration is applied on the MEMS accelerometer.

For example, as shown in FIGS. 3A-3D, a light beam repeatedly propagates between waveguide 122 and 124. As further shown in the example of FIG. 3A, the vibrating proof mass 115 moves closer to the waveguides 122 and 124 in the z-direction when rotation is applied in the y-direction. FIG. 3B is a graphical representation of the light beam propagating through waveguides 122 and 124 at given time intervals and the optical power of the light beam is represented by waves 315-1 to 315-13. The light beam propagates in waveguide 122 until it enters central region 155 at point of entrance 119. Accordingly, waves 315-1 to 315-4 representing optical power of light beam have peaks in waveguide 122 but none in waveguide 124.

Because of the proximity of waveguides 122 and 124 in central region 155, an evanescent field is overlapping between waveguides 122 and 124. The evanescent coupling of modes in waveguides 122 and 124 causes the light beam to propagate back and forth between waveguides 122 and 124 in central region 155. Accordingly, in the central region 155, wave 315-5 peaks in waveguide 124, wave 315-6 peaks in both waveguides 122 and 124, wave 315-7 peaks in waveguide 122, wave 315-8 peaks in waveguide 124 and wave 315-9 peaks in waveguides 122 and 124.

Central region 155 ends at a point of separation 117 after which waveguides 122 and 124 are widened. After the point of separation, the light beam cannot easily propagate back and forth between waveguide 122 and 124. In the example shown in FIGS. 3A and 3B, the MEMS gyroscope is configured such that when the vibrating proof mass 115 is closest to waveguides 122 and 124, a majority of the optical power is in waveguide 122 at the point of separation 117. Accordingly, after the point of separation 117, the peaks in waves 315-10 to 315-13 are more prominent in waveguide 122 than waveguide 124.

Photodetectors 112 and 114 then detect the amount of power at ends 122-2 and 124-2 by converting the received optical signals into electrical signals. These signals are then received by processor 195 to determine the position of the vibrating proof mass 115 using Equation 1. Displacement 151 shown in FIG. 3A is represented at the output of ends 122-2 and 124-2 by the difference in the optical power detected in waveguide 122 and 124 at ends 122-2 and 124-2 respectively. The rotation and/or linear acceleration being measured by the MEMS device 100 can then be determined based on displacement of the vibrating proof mass 11, which is proportional to the rotation or linear acceleration.

Similarly, FIG. 3C shows an example embodiment of a MEMS device, wherein when rotation is applied in the y-direction, the vibrating proof mass 115 moves away from waveguides 122 and 124 in the z-direction. In this example, in the central region 155, light beam repeatedly propagates back and forth between waveguides 122 and 124. As shown in FIG. 3D, wave 315-5 peaks in waveguide 124, wave 315-6 peaks in waveguide 122, wave 315-7 has a higher peak in waveguide 124, wave 315-8 has a higher peak in waveguide 122 and wave 315-9 peaks in waveguides 122 and 124.

In the example shown in FIGS. 3C and 3D, MEMS gyroscope 100 is configured such that when the vibrating proof mass 115 is farthest from waveguides 122 and 124, majority of the optical power is in waveguide 124 at the point of separation 117. Accordingly, in the example shown in FIG. 3D, at the point of separation 117, there is more optical power in waveguide 124 than waveguide 122. Consequently, after the point of separation 117, the peaks in waves 315-10 to 315-13 are more prominent in waveguide 124 than waveguide 122.

Returning back to FIG. 1, in exemplary embodiments, coupling length L can be adjusted, which in turn adjusts the optical power transfer from waveguide 122 to waveguide 124. For example, the optical coupling length L can be adjusted so that when the vibrating proof mass 115 is in the upper most position, majority of the optical power is in waveguide 122 at the point of separation, and majority of the optical power is in waveguide 124 at the point of separation when the vibrating proof mass 115 is in the lower most position.

Figure 4:
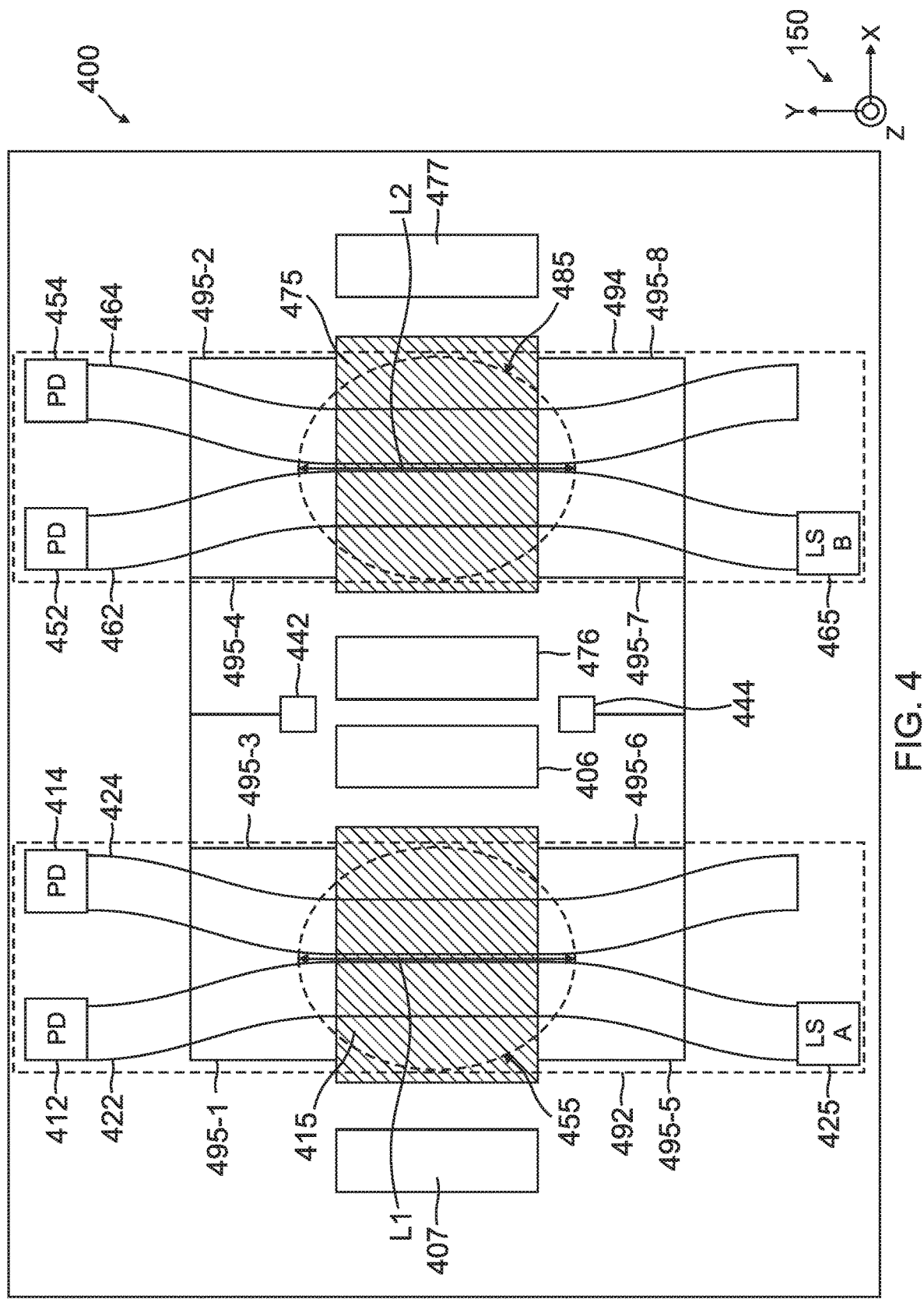
FIG. 4 is a top view of one exemplary embodiment of a MEMS device including two optical directional couplers and two vibrating proof masses according to the embodiments of the present disclosure.

FIG. 4 illustrates another example embodiment of a MEMS device comprising at least one optical directional coupler. MEMS device 400 shown in FIG. 4, comprises two directional couplers 492 and 494, both of which are used in the process of determining the angular rate of rotation in the MEMS device, by determining positions of vibrating proof masses 415 and 475. For example, FIG. 4 is one example of MEMS device 400 that uses two directional couplers, each directional coupler having two waveguides. As seen in FIG. 4, MEMS device 400 includes waveguides 422 and 424 comprised in a first directional coupler 492, and waveguides 462 and 464 comprised in a second directional coupler 496.

MEMS device 400 includes at least one light source 425. In exemplary embodiments, light source 425 is coupled to first directional coupler 492. In further exemplary embodiments, light source 425 is also coupled to second directional coupler 494. In exemplary embodiments, MEMS device 400 includes a second light source 465 coupled to second directional coupler 494. Light sources 425 and 465 function in a manner similar to light source 125 of MEMS device 100.

First directional coupler 492 further includes two photodetectors 412 and 414 that measure the power of the light beam(s) in waveguides 422 and 424 respectively. Second directional coupler 494 further includes two photodetectors 452 and 454 that measure the power of the light beam(s) in waveguides 462 and 464 respectively. Photodetectors 412, 452, 414 and 454 function in a manner similar to photodetectors 112 and 114. Waveguides 422, 424, 462 and 464 are coupled to photodetectors 412, 414, 452 and 454 respectively, and determine the values of optical power in the respective waveguides.

MEMS device 400 further includes two vibrating proof masses 415 and 475, coupled to directional couplers 492 and 494 respectively. In exemplary embodiments, vibrating proof masses 415 and 475 are identical to each other. That is, vibrating proof masses 415 and 475 have the same dimensions, and are fabricated from identical material.

Further, vibrating proof mass 415 is coupled to a first electrode 407 and vibrating proof mass 475 is coupled to second electrode 477. In exemplary embodiments, MEMS device 400 further includes a third electrode 406 coupled to vibrating proof mass 415 and fourth electrode 476 coupled to vibrating proof mass 475. First electrode 407 excites the vibrating proof mass 415 to vibrate in the first direction (for example, x-direction), and the second electrode 477 excited vibrating proof mass 475 to vibrate in the first direction.

When a rotation is applied on MEMS device 400 around an axis in the second direction (for example, y-axis), which is an in-plane axis, vibrating proof masses 415 and 475 are displaced in a third direction (for example, z-axis) due to Coriolis effect. In exemplary embodiments, the second electrode 407 excites the vibrating proof mass 415 through at least one of electrostatic excitation, piezoelectric excitation, electromagnetic excitation. In exemplary embodiments, the second electrode 477 excites the vibrating proof mass 475 through at least one of electrostatic excitation, piezoelectric excitation, electromagnetic excitation.

Displacement of vibrating proof mass 415 in the x-direction is sensed by electrode 406, and displacement of vibrating proof mass 475 in the x-direction is sensed by electrode 476. Vibrating proof masses 415 and 475 are further connected to anchors 442 and 444 using springs 495-1 to 495-8, which enable vibrating proof masses 415 and 475 to move freely in x and z directions. Displacement of vibrating proof mass 415 in the z-direction from waveguide 422 and 424 is determined based on a first value of optical power detected by photodetector 412 and a second value of optical power detected by photodetector 414. Displacement of vibrating proof mass 475 in the z-direction from waveguides 462 and 464 is determined based on a third value of optical power detected by photodetector 452 and a fourth value of optical power detected by photodetector 454.

In exemplary embodiments, the values of optical power detected by photodetectors 412, 414, 452 and 454 are sent to a processor such as a processor 195 and displacement of vibrating proof mass 415 and the displacement of vibrating proof mass 475 is determined. The rotation incident on the MEMS device 400 can then be determined based on a differential value calculated between displacement of vibrating proof mass 415 and vibrating proof mass 475.

In exemplary embodiments, the MEMS device 400 is adjusted such that displacement in the first direction (for example, the x-axis) of vibrating proof mass 415 is shifted by 180 degrees compared to displacement of vibrating proof mass 475 in the first direction. When external linear acceleration is applied on MEMS device 400 and consequently, to the vibrating proof masses 415 and 475 (for example, vibrations) the proof masses will move in the same direction. Accordingly, the displacement of the proof masses in the first direction could be subtracted from the movement caused by the rotation.

Figure 5:
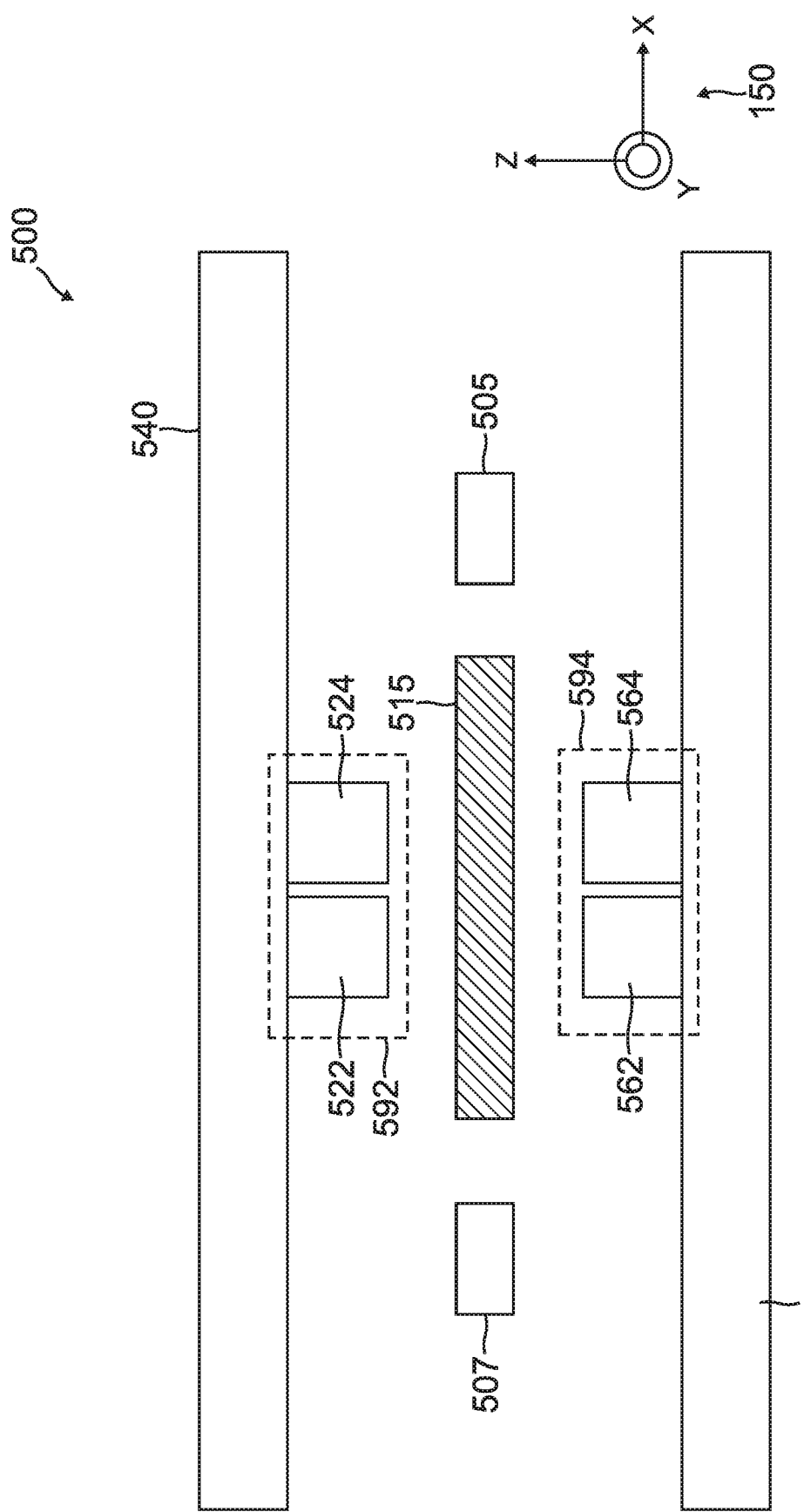
FIG. 5 is a cross section view of one exemplary embodiment of a MEMS device including two directional couplers according to the embodiments of the present disclosure.

FIG. 5 is another example embodiment of a MEMS device comprising two differential couplers. MEMS device 500 comprises a first directional coupler 592, a second directional coupler 594 and a single vibrating proof mass 515. First directional coupler 592 includes at least two waveguides 522 and 524 and the second directional coupler 594 includes at least two waveguides 562 and 564. Waveguides 522 and 524, and waveguides 562 and 564 are positioned in a manner similar to waveguides 122 and 124 of MEMS device 100 shown in FIG. 1.

Directional couplers 592 and 594 are further coupled to at least one light source such as light source 125 that provides a light beam in at least one of the four waveguides 522, 524, 562 and 564. In exemplary embodiments, each differential coupler is coupled to a separate light source. In exemplary embodiments, each waveguide is coupled to its own separate light source. The light source(s) provide at least one light beam that propagates through waveguides 522, 524, 562 and 564.

The vibrating proof mass 515 is placed between differential couplers 592 and 594. That is, vibrating proof mass 515 is under differential coupler 592 and above differential coupler 594. In exemplary embodiments, waveguides 522 and 524 of differential coupler 592 are fabricated on a substrate 540, and waveguides 562 and 564 of differential coupler 594 are fabricated on substrate 510. Vibrating proof mass 515 is coupled to a first electrode 507 and second electrode 505. First electrode 506 excited the vibrating proof mass 515 to vibrate in the first direction (for example, x-axis). Displacement of vibrating proof mass 515 in the first direction is sensed by electrode 505. When a rotation is applied to MEMS device 500 in the second direction (for example, y-axis), which is an in-plane axis, the vibrating proof mass 515 is displaced in a third direction (for example, z-axis) due to Coriolis effect.

As discussed in the embodiments with respect to FIG. 1, the effective refractive index of the waveguides in a differential coupler changes depending on the displacement of the vibrating proof mass close to or away from the differential coupler. Accordingly, when the vibrating proof mass 515 moves closer to waveguides 522 and 524, the optical power is more significant in waveguide 522. Simultaneously, vibrating proof mass 515 moves away from waveguides 562 and 564. Thus, the optical power is more significant in waveguide 564 than waveguide 562.

MEMS device 500 further includes four photodetectors, each coupled to one of the four waveguides 522, 524 562 and 564 to detect the optical power output by each of the waveguides. The position of vibrating proof mass 515 is then determined twice using Equation 1. The position of vibrating proof mass 515 is first determined using the output from photodetectors coupled to waveguides 522 and 524. The position of vibrating proof mass 515 is then determined a second time using the output from photodetectors coupled to waveguides 562 and 564. Determining the position of the vibrating proof mass 515 twice using two different readouts improves the linearity of the measurements. Further, because two signals are measured, the signal-to-noise ratio (SNR) in optical signal is improved.

Figure 6:
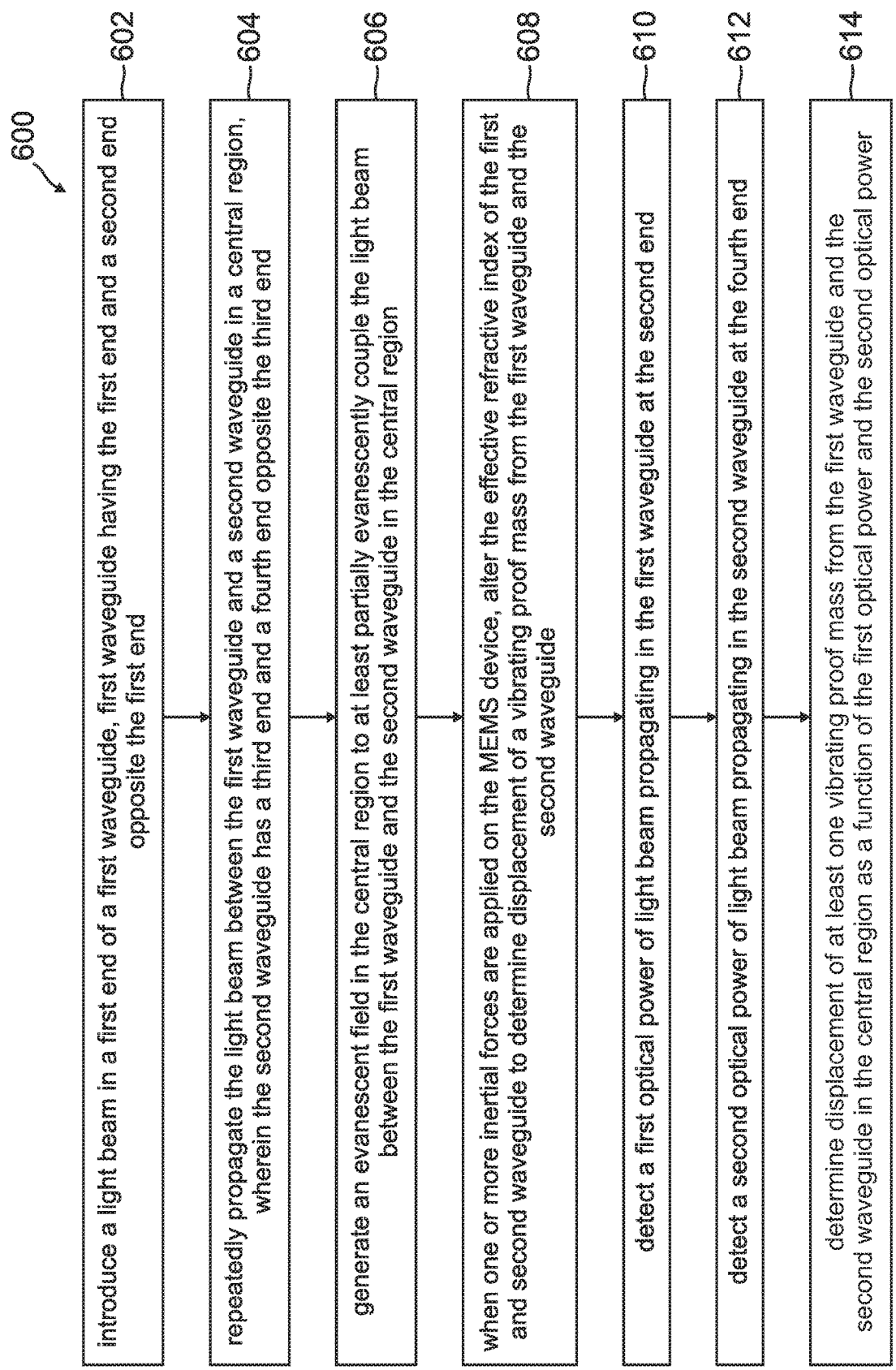
FIG. 6 is a flow diagram of one exemplary embodiment of a method for determining rotation in a microelectromechanical systems (MEMS) device.

FIG. 6 is a flow diagram of an example method 600 of device sensing inertial forces in a MEMS device, such as MEMS device 100. It should be understood that method 600 may be implemented in conjunction with any of the various embodiments and implementations described in this disclosure above or below. As such, elements of method 600 may be used in conjunction with, in combination with, or substituted for elements of those embodiments. Further, the functions, structures and other description of elements for such embodiments described herein may apply to like named elements of method 600 and vice versa.

Method 600 begins at 602 with introducing a light beam in a first end of a first waveguide, such as waveguide 122, first waveguide having the first end and a second end opposite the first end. Method 600 proceeds to 604 with repeatedly propagating the light beam back and forth between the first waveguide and a second waveguide, such as waveguide 124, in a central region, such as central region 155. The second waveguide has a third end and a fourth end opposite the third end.

Method 600 proceeds to 606 with generating an evanescent field in the central region of the first waveguide and the second waveguide. Consequently, the light beam is at least partially evanescently coupled between the first waveguide and the second waveguide in the central region. In exemplary embodiments of method 600, the distance between the first waveguide and the second waveguide in a central region is less than distance between the second end of the first waveguide and the fourth end of the second waveguide.

Method 600 proceeds to 608 with altering the effective refractive index of the first and second waveguide in response to a displacement of at least one vibrating proof mass, such as vibrating proof mass 115 from the first waveguide and the second waveguide.

Method 600 then proceed to 610 with detecting a first value for optical power of light beam propagating in the first waveguide at the second end. In one embodiment, the first value of optical power of light beam propagating in the first waveguide at the second end may be determined by a photodetector, such as photodetector 112. Method 600 then proceeds to 612 with determining a second value for optical power of light beam propagating in the second waveguide at the fourth end. The second value of optical power of light beam propagating in the second waveguide at the fourth end may be determined by a photodetector, such as photodetector 114.

Method 600 further proceeds to 614 with determining displacement of the at least one vibrating proof mass, such as vibrating proof mass 115, as a function of the first optical power and the second optical power. In exemplary embodiments of method 600, determining displacement of at least one vibrating proof mass as a function of the first optical power and the second optical power further comprises determining the displacement of the at least one vibrating proof mass in a z-direction from the first waveguide and the second waveguide as a function of the difference between the first optical power and the second optical power.

Finally, in exemplary embodiments, method 600 further comprises determining a measurement of inertial forces applied to the MEMS device based on the displacement of the vibrating proof mass. In exemplary embodiments of method 600, the MEMS device is a MEMS gyroscope.

In some exemplary embodiments, method 600 may further comprise at the same time performing 602-614 with a second optical directional coupler. This second optical directional coupler comprises a third waveguide, such as waveguide 462 or 562 and a fourth waveguide, such as waveguide 464 and 564. In one such exemplary embodiment, method 600 comprises introducing a second light beam in a fifth end of a third waveguide, such as waveguide 462 or 562. The third waveguide has a fifth end and a sixth end opposite the fifth end. In such an example, method 600 further comprises repeatedly propagating the second light beam back and forth from the third waveguide to a fourth waveguide in the second central region, such as central region 485. The fourth waveguide has a seventh end and an eighth end opposite the seventh end. In exemplary embodiments, the distance between the third waveguide and the fourth waveguide in a second central region is less than distance between the sixth end of the third waveguide and the eighth end of the fourth waveguide.

This example of method 600 further comprises generating an evanescent field in the second central region to at least at least partially evanescently couple the second light beam between the between the third waveguide and the fourth waveguide in a second central region. In such an example, method 600 further comprises when rotation is applied on the MEMS gyroscope, altering the effective refractive index of the third and fourth waveguide to determine a second displacement of the at least one vibrating proof mass from the third waveguide and the fourth waveguide.

Further, in this example method 600 comprises detecting a third optical power of second light beam propagating in the third waveguide at the sixth end, detecting a fourth optical power of second light beam propagating in the fourth waveguide at the eighth end; and determining the second displacement of the at least one vibrating proof mass in a z-direction from the third waveguide and the fourth waveguide in the second central region as a function of the third optical power and the fourth optical power.

In one exemplary embodiment of method 600 determining displacement of at least one vibrating proof mass in a z-direction further comprises determining a displacement of a first of the at least one vibrating proof mass in a z-direction from the first waveguide and the second waveguide in the central region based on the first optical power. Further, determining a second displacement of the at least one vibrating proof mass in a z-direction further comprises determining a displacement of a second of the at least one vibrating proof mass in a z-direction from the third waveguide and the fourth waveguide in the second central region based on the third optical power and the fourth optical power.

EXAMPLE EMBODIMENTS

Example 1 includes a microelectromechanical systems (MEMS) device comprises: an optical directional coupler comprising: at least one light source configured to provide a light beam; at least one substrate; a first waveguide formed on the at least one substrate, the first waveguide having a first end and the second end, wherein the first end of the first waveguide is coupled to the at least one light source, wherein the light beam is introduced into the first end of the first waveguide; a second waveguide formed on the substrate, the second waveguide having a third end and a fourth end, wherein the first waveguide and the second waveguide are positioned adjacent to each other at a central region of the optical directional coupler at a distance such that the light beam is at least partially evanescently coupled between the first waveguide and the second waveguide in the central region when the light beam is introduced into the first end of the first waveguide; a first photodetector coupled to a second end of the first waveguide, wherein the first photodetector is configured to detect a first optical power in the light beam propagating through the first waveguide at the second end; and a second photodetector coupled to a fourth end of the second waveguide, wherein the second photodetector is configured to detect a second optical power in the light beam propagating through the second waveguide at the fourth end; at least one vibrating proof mass positioned adjacent to the optical directional coupler in a first direction from the optical directional coupler, wherein the at least one vibrating proof mass is equidistant from the first waveguide and the second waveguide, wherein when one or more inertial forces are applied to the MEMS device in the first or a second direction, the at least one vibrating proof mass is configured to move in the first direction; at least one processor coupled to the first photodetector and the second photodetector, wherein the processor is configured to determine the displacement of the at least one proof mass from the optical directional coupler as a function of the first optical power and the second optical power.

Example 2 includes the MEMS device of Example 1, wherein the at least two waveguides comprise planar optical material.

Example 3 includes the MEMS device of Example 2, wherein the planar optical material comprises at least one of epoxy and silicon.

Example 4 includes the MEMS device of any of Examples 1-3, wherein the at least one vibrating proof mass is configured to vibrate in a third direction when the at least one vibrating proof mass is excited by the at least one electrode through at least one of electrostatic excitation, piezoelectric excitation, electromagnetic excitation.

Example 5 includes the MEMS device of any of Examples 1-4, wherein the at least one proof mass comprises silicon.

Example 6 includes the MEMS device of any of Examples 1-5, further comprising: a second optical directional coupler, wherein the second optical directional coupler comprises: a third waveguide formed on at least one substrate, the third waveguide having a fifth end and a sixth end opposite the fifth end, wherein a second light beam is introduced into the fifth end of the third waveguide; a fourth waveguide formed on the at least one substrate, the fourth waveguide having a seventh end and an eighth end opposite the seventh end, wherein the third waveguide and the fourth waveguide are positioned adjacent to each other at a second central region of the second optical directional coupler at a second distance such that the second light beam is at least partially evanescently coupled between the third waveguide and the fourth waveguide when the second light beam is introduced into the fifth end of the third waveguide; a third photodetector coupled to a sixth end of the third waveguide, wherein the third photodetector is configured to detect a third optical power in the second light beam propagating through the third waveguide at the sixth end; and a fourth photodetector coupled to a eighth end of the fourth waveguide, wherein the fourth photodetector is configured to detect a fourth optical power in the second light beam propagating through the fourth waveguide at the eighth end; wherein the at least one vibrating proof mass is positioned adjacent to the optical directional coupler in the first direction from the second optical directional coupler, wherein the at least one vibrating proof mass is equidistant from the third waveguide and the fourth waveguide, wherein when one or more inertial forces are applied on the MEMS device in the first or the second direction, the at least one vibrating proof mass is configured to move in the first direction; and wherein the at least one processor is further coupled to the third photodetector and the fourth photodetector, wherein the processor is configured to determine a second displacement of the at least one vibrating proof mass from the second optical directional coupler as a function of the third optical power and the fourth optical power.

Example 7 includes the MEMS device of Example 6, wherein the at least one vibrating proof mass is positioned between the first optical directional coupler and the second optical directional coupler.

Example 8 includes the MEMS device of Example 6, wherein the at least one vibrating proof mass further comprises: a first vibrating proof mass, wherein the displacement of the at least one vibrating proof mass from the first waveguide and the second waveguide comprises displacement of the first vibrating proof mass from the first waveguide and the second waveguide; and a second vibrating proof mass, wherein the second displacement of the at least one vibrating mass from the third waveguide and fourth waveguide comprises displacement of the second vibrating proof mass from the third waveguide and the fourth waveguide.

Example 9 includes the MEMS device of Example 8, wherein the second vibrating proof mass is identical to the first vibrating proof mass.

Example 10 includes the MEMS device of any of Examples 6-9, wherein the at least one light source comprises: a single light source configured to: provide the light beam introduced at the first end of the first waveguide of the first optical directional coupler; and provide the second light beam introduced at the fifth end of the third waveguide of the second optical directional coupler.

Example 11 includes the MEMS device of any of Examples 6-9, wherein the at least one light source comprises: a first light source configured to provide the light beam; and a second light source configured to provide the second light beam.

Example 12 includes the MEMS device of any of Examples 1-11, wherein the distance between the first waveguide and the second waveguide in the central region is less than distance between the first waveguide at the second end and the second waveguide at the fourth end.

Example 13 includes the MEMS device of any of Examples 1-13, wherein the MEMS device is at least one of a MEMS gyroscope and accelerometer.

Example 14 includes the MEMS device of any of Examples 1-13, wherein the processor is configured to determine the displacement of the at least one vibrating proof mass in the first direction from the first waveguide and the second waveguide as a function of the first optical power and the second optical power.

Example 15 includes a method for sensing inertial forces in a microelectromechanical systems (MEMS) device, the method comprising: introducing a light beam in a first end of a first waveguide, first waveguide having the first end and a second end opposite the first end; repeatedly propagating the light beam between the first waveguide and a second waveguide in a central region, wherein the second waveguide has a third end and a fourth end opposite the third end; generating an evanescent field in the central region to at least partially evanescently couple the light beam between the first waveguide and the second waveguide in the central region; when one or more inertial forces are applied on the MEMS device, altering the effective refractive index of the first and second waveguide in response to a displacement of at least one vibrating proof mass from the first waveguide and the second waveguide; detecting a first optical power of light beam propagating in the first waveguide at the second end; detecting a second optical power of light beam propagating in the second waveguide at the fourth end; and determining displacement of the at least one vibrating proof mass as a function of the first optical power and the second optical power.

Example 16 includes the method of Example 15, further comprising: determining either an angular rate or an acceleration in the MEMS device based on the displacement of the at least one vibrating proof mass.

Example 17 includes the method of any of Examples 15-16, further comprising: introducing a second light beam in a fifth end of a third waveguide, third waveguide having the fifth end and a sixth end opposite the fifth end; repeatedly propagating the second light beam between the third waveguide and a fourth waveguide in a second central region of the third waveguide and the fourth waveguide wherein the second waveguide has a third end and a fourth end opposite the third end; generating an evanescent field in the second central region to at least partially evanescently couple the second light beam between the between the third waveguide and the fourth waveguide in a second central region; when one or more inertial forces are applied on the MEMS device, altering the effective refractive index of the third and fourth waveguide to determine a second displacement of the at least one vibrating proof mass from the third waveguide and the fourth waveguide; detecting a third optical power of second light beam propagating in the third waveguide at the sixth end; detecting a fourth optical power of second light beam propagating in the fourth waveguide at the eighth end;

and determining the second displacement of the at least one vibrating proof mass as a function of the third optical power and the fourth optical power.

Example 18 includes the method of Example 17, wherein determining displacement of at least one vibrating proof mass further comprises determining a displacement of a first of the at least one vibrating proof mass in the first direction from the first waveguide and the second waveguide in the central region based on the first optical power; determining a second displacement of the at least one vibrating proof mass further comprises determining a displacement of a second of the at least one vibrating proof mass in the first direction from the third waveguide and the fourth waveguide in the second central region based on the third optical power and the fourth optical power.

Example 19 includes the method of any of Examples 15-18, wherein determining displacement of at least one vibrating proof mass as a function of the first optical power and the second optical power further comprises determining the displacement of the at least one vibrating proof mass in the first direction from the first waveguide and the second waveguide as a function of the first optical power and the second optical power.

Example 20 includes the method of any of Examples 15-19, wherein the MEMS device is at least one of a MEMS gyroscope and a MEMS accelerometer.

In various alternative embodiments, system elements, method steps, or examples described throughout this disclosure (such as the processor 195 and/or sub-parts thereof, for example) may be implemented using one or more computer systems, field programmable gate arrays (FPGAs), analog systems, or similar devices and/or comprising a processor coupled to a memory and executing code to realize those elements, processes, steps or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL). Processor 195 can be an analog processor or a digital processor.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A microelectromechanical systems (MEMS) device comprising:
an optical directional coupler comprising:
at least one light source configured to provide a light beam;
at least one substrate;
a first waveguide formed on the at least one substrate, the first waveguide having a first end and the second end, wherein the first end of the first waveguide is coupled to the at least one light source, wherein the light beam is introduced into the first end of the first waveguide;
a second waveguide formed on the substrate, the second waveguide having a third end and a fourth end, wherein the first waveguide and the second waveguide are positioned adjacent to each other at a central region of the optical directional coupler at a distance such that the light beam is at least partially evanescently coupled between the first waveguide and the second waveguide in the central region when the light beam is introduced into the first end of the first waveguide;
a first photodetector coupled to a second end of the first waveguide, wherein the first photodetector is configured to detect a first optical power in the light beam propagating through the first waveguide at the second end; and
a second photodetector coupled to a fourth end of the second waveguide, wherein the second photodetector is configured to detect a second optical power in the light beam propagating through the second waveguide at the fourth end;
at least one vibrating proof mass positioned adjacent to the optical directional coupler in a first direction from the optical directional coupler, wherein the at least one vibrating proof mass is equidistant from the first waveguide and the second waveguide, wherein when one or more inertial forces are applied to the MEMS device in the first or a second direction, the at least one vibrating proof mass is configured to move in the first direction;
at least one processor coupled to the first photodetector and the second photodetector, wherein the processor is configured to determine the displacement of the at least one proof mass from the optical directional coupler as a function of the first optical power and the second optical power.

2. The MEMS device of claim 1, wherein the at least two waveguides comprise planar optical material.

3. The MEMS device of claim 2, wherein the planar optical material comprises at least one of epoxy and silicon.

4. The MEMS device of claim 1, wherein the at least one vibrating proof mass is configured to vibrate in a third direction when the at least one vibrating proof mass is excited by the at least one electrode through at least one of electrostatic excitation, piezoelectric excitation, and electromagnetic excitation.

5. The MEMS device of claim 1, wherein the at least one proof mass comprises silicon.

6. The MEMS device of claim 1, further comprising:
a second optical directional coupler, wherein the second optical directional coupler comprises:
a third waveguide formed on at least one substrate, the third waveguide having a fifth end and a sixth end opposite the fifth end, wherein a second light beam is introduced into the fifth end of the third waveguide;

a fourth waveguide formed on the at least one substrate, the fourth waveguide having a seventh end and an eighth end opposite the seventh end, wherein the third waveguide and the fourth waveguide are positioned adjacent to each other at a second central region of the second optical directional coupler at a second distance such that the second light beam is at least partially evanescently coupled between the third waveguide and the fourth waveguide when the second light beam is introduced into the fifth end of the third waveguide;

a third photodetector coupled to a sixth end of the third waveguide, wherein the third photodetector is configured to detect a third optical power in the second light beam propagating through the third waveguide at the sixth end; and a fourth photodetector coupled to a eighth end of the fourth waveguide, wherein the fourth photodetector is configured to detect a fourth optical power in the second light beam propagating through the fourth waveguide at the eighth end;

wherein the at least one vibrating proof mass is positioned adjacent to the optical directional coupler in the first direction from the second optical directional coupler, wherein the at least one vibrating proof mass is equidistant from the third waveguide and the fourth waveguide, wherein when one or more inertial forces are applied on the MEMS device in the first or the second direction, the at least one vibrating proof mass is configured to move in the first direction; and wherein the at least one processor is further coupled to the third photodetector and the fourth photodetector, wherein the processor is configured to determine a second displacement of the at least one vibrating proof mass from the second optical directional coupler as a function of the third optical power and the fourth optical power.

7. The MEMS device of claim 6, wherein the at least one vibrating proof mass is positioned between the first optical directional coupler and the second optical directional coupler.

8. The MEMS device of claim 6, wherein the at least one vibrating proof mass further comprises:
a first vibrating proof mass, wherein the displacement of the at least one vibrating proof mass from the first waveguide and the second waveguide comprises displacement of the first vibrating proof mass from the first waveguide and the second waveguide; and
a second vibrating proof mass, wherein the second displacement of the at least one vibrating mass from the third waveguide and fourth waveguide comprises displacement of the second vibrating proof mass from the third waveguide and the fourth waveguide.

9. The MEMS device of claim 8, wherein the second vibrating proof mass is identical to the first vibrating proof mass.

10. The MEMS device of claim 6, wherein the at least one light source comprises:
a single light source configured to:
provide the light beam introduced at the first end of the first waveguide of the first optical directional coupler; and
provide the second light beam introduced at the fifth end of the third waveguide of the second optical directional coupler.

11. The MEMS device of claim 6, wherein the at least one light source comprises:

a first light source configured to provide the light beam; and
a second light source configured to provide the second light beam.

12. The MEMS device of claim 1, wherein the distance between the first waveguide and the second waveguide in the central region is less than distance between the first waveguide at the second end and the second waveguide at the fourth end.

13. The MEMS device of claim 1, wherein the MEMS device is at least one of a MEMS gyroscope and accelerometer.

14. The MEMS device of claim 1, wherein the processor is configured to determine the displacement of the at least one vibrating proof mass in the first direction from the first waveguide and the second waveguide as a function of the first optical power and the second optical power.

15. A method for sensing inertial forces in a microelectromechanical systems (MEMS) device, the method comprising:
introducing a light beam in a first end of a first waveguide, first waveguide having the first end and a second end opposite the first end;
repeatedly propagating the light beam between the first waveguide and a second waveguide in a central region, wherein the second waveguide has a third end and a fourth end opposite the third end;
generating an evanescent field in the central region to at least partially evanescently couple the light beam between the first waveguide and the second waveguide in the central region;
when one or more inertial forces are applied on the MEMS device, altering the effective refractive index of the first and second waveguide in response to a displacement of at least one vibrating proof mass from the first waveguide and the second waveguide;
detecting a first optical power of light beam propagating in the first waveguide at the second end;
detecting a second optical power of light beam propagating in the second waveguide at the fourth end; and
determining displacement of the at least one vibrating proof mass as a function of the first optical power and the second optical power.

16. The method of claim 15, further comprising:
determining either an angular rate or an acceleration in the MEMS device based on the displacement of the at least one vibrating proof mass.

17. The method of claim 15, further comprising:
introducing a second light beam in a fifth end of a third waveguide, third waveguide having the fifth end and a sixth end opposite the fifth end;
repeatedly propagating the second light beam between the third waveguide and a fourth waveguide in a second central region of the third waveguide and the fourth waveguide wherein the second waveguide has a third end and a fourth end opposite the third end;
generating an evanescent field in the second central region to at least partially evanescently couple the second light beam between the between the third waveguide and the fourth waveguide in a second central region;
when one or more inertial forces are applied on the MEMS device, altering the effective refractive index of the third and fourth waveguide to determine a second displacement of the at least one vibrating proof mass from the third waveguide and the fourth waveguide;
detecting a third optical power of second light beam propagating in the third waveguide at the sixth end;

detecting a fourth optical power of second light beam propagating in the fourth waveguide at the eighth end; and determining the second displacement of the at least one vibrating proof mass as a function of the third optical power and the fourth optical power.

18. The method of claim 17, wherein determining displacement of at least one vibrating proof mass further comprises determining a displacement of a first of the at least one vibrating proof mass in the first direction from the first waveguide and the second waveguide in the central region based on the first optical power;

determining a second displacement of the at least one vibrating proof mass further comprises determining a displacement of a second of the at least one vibrating proof mass in the first direction from the third waveguide and the fourth waveguide in the second central region based on the third optical power and the fourth optical power.

19. The method of claim 15, wherein determining displacement of at least one vibrating proof mass as a function of the first optical power and the second optical power further comprises determining the displacement of the at least one vibrating proof mass in the first direction from the first waveguide and the second waveguide as a function of the first optical power and the second optical power.

20. The method of claim 15, wherein the MEMS device is at least one of a MEMS gyroscope and a MEMS accelerometer.

* * * * *